United States Patent [19]

Kawai et al.

[11] Patent Number: 5,918,930
[45] Date of Patent: Jul. 6, 1999

[54] VEHICLE SEAT

[75] Inventors: Yoshiaki Kawai, Tokyo-to; Yoshitaka Ogimura; Noritaka Kasugai, both of Aichi-ken, all of Japan

[73] Assignee: JC Associates Co., Ltd., Tokyo, Japan

[21] Appl. No.: 08/944,886

[22] Filed: Oct. 6, 1997

[30] Foreign Application Priority Data

Oct. 7, 1996 [JP] Japan ................................. 8-284679
Aug. 29, 1997 [JP] Japan ................................. 9-249469

[51] Int. Cl.⁶ .................................................. A47C 7/72
[52] U.S. Cl. .................................. 297/180.13; 297/180.1
[58] Field of Search .......................... 297/180.1, 180.13, 297/180.14, 452.42, 452.46, 452.47

[56] References Cited

U.S. PATENT DOCUMENTS

| | | | |
|---|---|---|---|
| 2,804,913 | 9/1957 | Pickard | 155/182 |
| 4,923,248 | 5/1990 | Feher | 297/180 |
| 4,997,230 | 3/1991 | Spitzluich | 297/180.13 X |
| 5,002,336 | 3/1991 | Feher | 297/180.13 |
| 5,016,302 | 5/1991 | Yu | 297/180.13 X |
| 5,370,439 | 12/1994 | Lowe et al. | 297/180.11 |
| 5,524,439 | 6/1996 | Gallup et al. | 62/3.5 |
| 5,626,386 | 5/1997 | Lush | 297/180.13 |

FOREIGN PATENT DOCUMENTS

| | | |
|---|---|---|
| 0 411 375 | 2/1991 | European Pat. Off. . |
| 0 582 734 | 2/1994 | European Pat. Off. . |
| 0 586 031 | 3/1994 | European Pat. Off. . |
| 2 630 056 | 10/1989 | France . |
| 2 694 527 | 2/1994 | France . |
| 39 03 303 | 8/1990 | Germany . |
| 42 00 825 | 7/1993 | Germany . |
| 43 23 164 | 1/1995 | Germany . |
| 54-178609 | of 1979 | Japan . |
| 60-142660 | 9/1985 | Japan . |
| 61-34948 | 3/1986 | Japan . |
| 63-106358 | 7/1988 | Japan . |
| 3-51048 | 5/1991 | Japan . |
| 929555 | 6/1963 | United Kingdom .............. 297/180.13 |

OTHER PUBLICATIONS

Patent Abstracts of Japan; vol. 17, No. 297 JP 05–023235, filed Feb. 2, 1993 (1 page).

Patent Abstracts of Japan; vol. 13, No. 446 JP 01–172012, filed Jul. 6, 1989 (1 page).

*Primary Examiner*—Milton Nelson, Jr.
*Attorney, Agent, or Firm*—Flynn, Thiel, Boutell & Tanis, P.C.

[57] ABSTRACT

A lower layer 10 formed by a non-permeable member, a permeable layer 11 formed by a permeable material which is adhesively secured to the upper surface of the lower layer 10, and an upper layer 12 mounted on the upper surface of the permeable layer 11 and having a permeable section 14 formed therein which provides a communication between the permeable layer 11 and an exterior are disposed toward a front surface of a vehicle seat 2. The vehicle seat 2 is provided with an air inlet port 15 through which an external air is introduced into the permeable layer 11. A hose 20 connects between the air inlet port 15 and an air discharge port 3A of an air conditioner 3. As the air conditioner 3 is operated to introduce part of the air which is delivered from the air discharge port 3A into the permeable layer 11, the air flows in contact with part of the body of a user which is disposed in contact with the permeable section 14.

9 Claims, 9 Drawing Sheets

VEHICLE SEAT

BACKGROUND OF THE INVENTION AND RELATED ART STATEMENT

1. Field of the Invention

The invention relates to a vehicle seat.

2. Description of the Prior Art

Recently, automobiles equipped with air conditioners are generally popular. An air conditioner supplies cold or warm air into a vehicle compartment through an air discharge port depending on the air temperature outside the vehicle, thus maintaining an appropriate air temperature within the compartment. A seat disposed in the compartment including a seating area and a back rest comprises a resilient cushioning member molded from urethane foam, for example, the surface of which is covered by a sheet member such as formed of synthetic leather or cloth. Since an air conditioner mounted on the vehicle is powered from an engine, it takes a length of time from the start of operation of the conditioner until a suitable temperature is reached within the compartment, depending on the capacity of the conditioner, a temperature difference between the inside and the outside of the vehicle, the dimension of the compartment, the number of occupying persons or the like. Accordingly if one gets in an automobile which is heated by solar radiation on a hot day in summer, discomfort may be experienced because of the heat accumulation to a high temperature of the seat itself which may be transferred to his body or which may cause a sweating of part of the body which comes into contact with the seat. To accommodate for this, it has been the practice in summer heretofore to place a cushion woven into a meshwork from natural material such as palm or flax on the seat to provide an air layer between the body and the seat which absorbs or releases moisture. Also known in the art is a concatenation of a multiplicity of heat absorbing spheres into a surface, which is placed on the seat. On the other hand, in winter, a warming cushion is laid on the seat to remove any discomfort that may result from bodily heat being lost by the cold seat. It is also known to provide a heater in the compartment in order to warm the seat or seats by the heat from the heater.

However, if such weaving or matting is placed on the seat, it takes a length of time until a suitable temperature is reached since the air conditioner has started to operate. The length of time increases for greater differences between the intended temperature and the outside air temperature because there is a limit on the capacity of the air conditioner. Thus, there remains a problem that one is forced to endure in the compartment while all windows are closed until the suitable temperature is reached. It is also noted in automobiles in which an air discharge port from an air conditioner is frequently located on a front seat, a temperature difference is caused between front and rear seats, presenting a problem that the temperature may be comfortable to a passenger sitting on one of these seats while it may be unsatisfactory or excessive to another passenger sitting on the other seat. In addition, it is possible as in summer that if the compartment air is cooled by the air conditioner to maintain a suitable temperature during the running of an automobile, the bodily heat is accumulated in the seat itself to cause a discomfort. Finally, there is a problem that it is difficult to choose a suitable temperature as the number of passengers increases because the sensation to hotness or coldness varies from person to person. If a heater is assembled into the seat, its use is limited to winter season. The provision of a heater for each seat causes a cost increase.

OBJECT AND SUMMARY OF THE INVENTION

Therefore, it is an object of the invention to provide a vehicle seat which is capable of providing a comfortable seated condition immediately upon initiation of operation of an air conditioner without being influenced by an air temperature within a compartment or the location of the seat while accommodating for a difference in the sensation to hotness and coldness by the individual user, and which can be manufactured inexpensively with a simple construction and which allows a reduction in the operating cost.

Such object is accomplished by providing a vehicle seat for use with a vehicle equipped with an air discharging mechanism, comprising a lower layer formed by a non-permeable member, a permeable layer mounted on top of the lower layer and formed by an air channel member having a clearance formed therein through which an air can flow, and an upper layer mounted to cover the upper surface of the permeable layer and including a permeable section which allows a communication between the permeable layer and an exterior, the lower layer, the permeable layer and the upper layer being disposed toward the front surface of the seat, and an introduction passage for providing a connection between the permeable layer and an air discharging port of the air discharging mechanism for introducing part of the air which is delivered from the air discharging mechanism into the permeable layer.

In accordance with the invention, when a user sits on the seat and air at a given temperature is introduced into the permeable layer from the air discharging mechanism through the introduction passage, an air channel is formed in the permeable layer which is held sandwiched between the permeable section contacted by the user and the lower layer, and the air which worked is externally displaced from the permeable section which is out of the contact with the user. Accordingly, in the permeable section which is contacted by the user, the introduced air at a given temperature flows in direct contact with body of the user, thus cooling or warming the body of the user in accordance with the temperature of the introduced air.

The above object is also accomplished by providing a vehicle seat for use with a vehicle equipped with an air discharging mechanism, comprising a lower layer formed by a non-permeable member, a permeable layer mounted on the upper surface of the lower layer and formed by an air channel member having a clearance formed therein through which an air can flow, and an upper layer formed by a non-permeable member which is mounted to cover the upper surface of the permeable layer and which is formed with a clearance at a given location which provides a communication between the permeable layer and an exterior, the lower layer, the permeable layer and the upper layer being disposed toward a front surface of the seat, and an introduction passage providing a connection between an air discharging port of the air discharging mechanism and the permeable layer for introducing part of the air which is delivered from the air discharging mechanism into the permeable layer.

In accordance with the invention, as a user sits on the seat and an air at a given temperature is introduced into the permeable layer from the air discharging mechanism through the introduction passage, an air channel is formed within the permeable layer which is held sandwiched between the lower layer and the non-permeable member of the upper layer, allowing the introduced air to flow within the permeable layer in contact with the non-permeable member of the upper layer while the air which worked is externally displaced through the passage. Accordingly, the body of the user can be cooled or warmed through the contacting surface of the upper layer in accordance with the temperature of the introduced air.

DETAILED DESCRIPTION OF THE PREFERRED EMBODIMENTS

Figure 1:
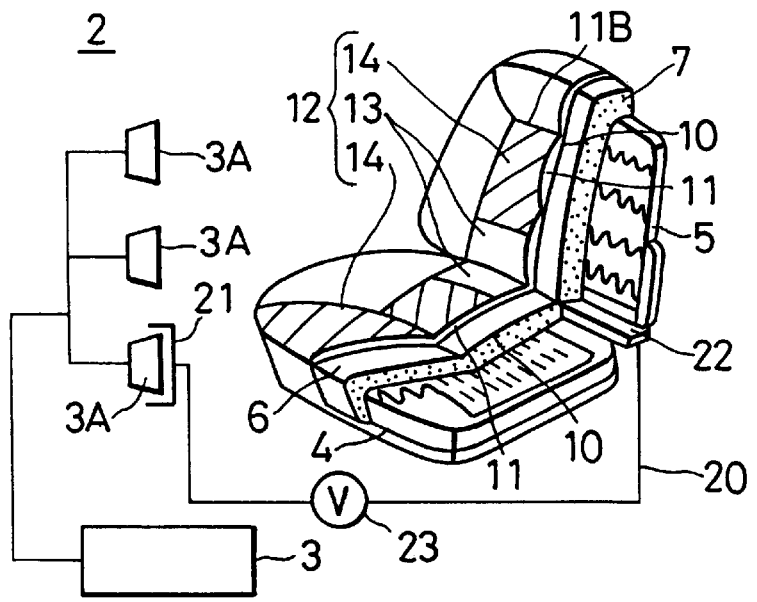
FIG. 1 is a perspective view, partly broken away, of a vehicle seat according to a first embodiment of the invention.

The invention will now be described with reference to the several embodiments shown in the drawings. As shown in FIG. 1, a vehicle seat 2 according to a first embodiment of the invention is used in an automobile which is equipped an air conditioner (air discharging mechanism) 3. The vehicle seat 2 includes a seat pad 6 which is mounted on a seat cushion frame 4 and a seat pad 7 for a back rest which is mounted on a seat back frame 5.

Figure 3:
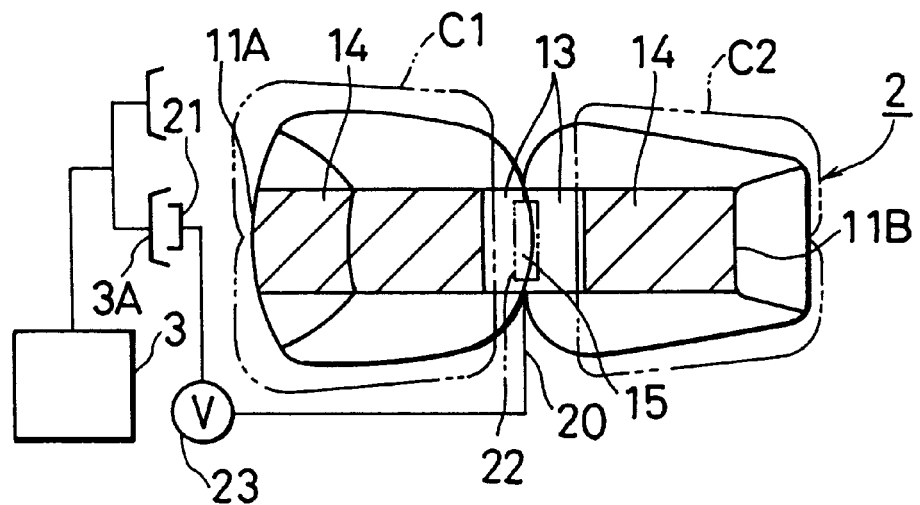
FIG. 3 is an illustration of the back rest of the vehicle seat shown in FIG. 1 when it is turned over.
Figure 4:
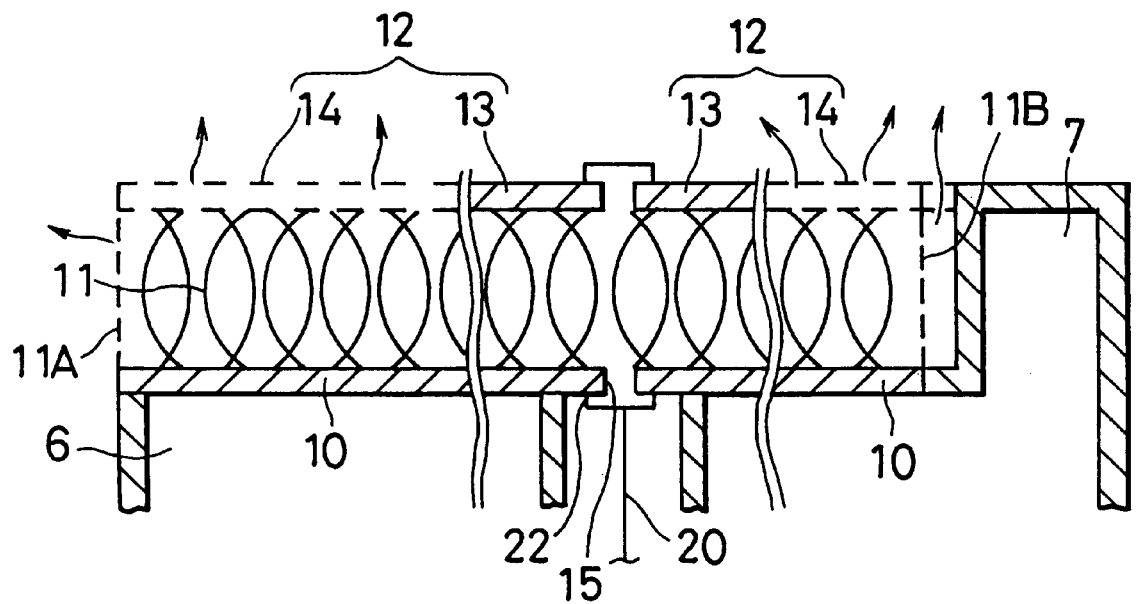
FIG. 4 is an illustration of a ventilating structure of the vehicle seat shown in FIG. 1.

Referring to FIG. 1, the vehicle seat 2 comprises a lower layer 10 formed by a sheet-like member (non-permeable member) such as formed from vinyl chloride, leather or the like, a permeable layer 11 mounted on top of the lower layer 10 and formed by a cushion member (air channel member) having a clearance formed therein through which an air can flow, and an upper layer 12 mounted on the upper surface of the permeable layer 11 and including a non-permeable section 13 and a permeable section 14 disposed at given locations thereon, it being understood that the lower layer 10, the permeable layer 11 and the upper layer 12 are formed in integrally continuous manner and disposed toward the front surface of the vehicle 2 (see FIG. 4). The permeable section 14 in the upper layer 12 is formed by a permeable textile fabric or meshy cloth and is disposed substantially in conformity to locations C1 (thigh and buttocks) and C2 (back) (see FIG. 3) which are contacted by a user as he sits on the seat. In the present embodiment, the permeable section 14 is disposed in a range narrower than the contacted locations C1, C2. (The permeable section 14 is shown hatched in FIGS. 1 and 3.) The non-permeable section 13 is formed by a sheet-like member having a heat insulating capability and is disposed at the location corresponding to the waste as a user sits on the seat, namely, over a given length across the seat pad 6 and the back rest 7 of the vehicle seat. The combination of the layers 10, 11 and 12 defines a ventilating structure on the front surface of the vehicle seat. The cushion member 11 exhibits a resilience and has a given thickness, and is formed by weaving a plastic mono-filament yarn in the manner of a pile yarn on a double pile loom into a honeycomb structure.

Figure 2:
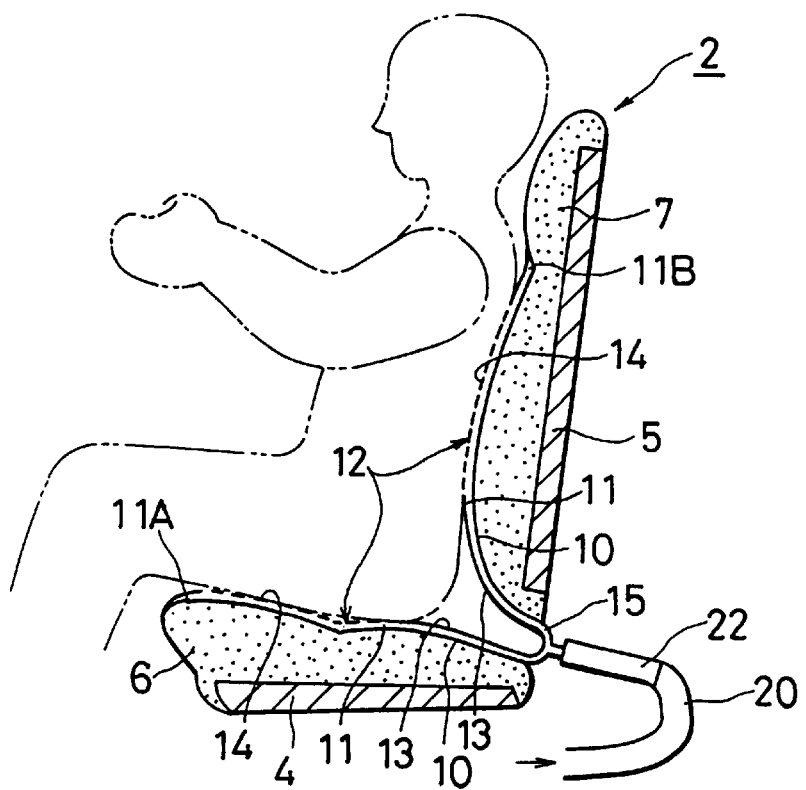
FIG. 2 is a longitudinal section of the vehicle seat shown in FIG. 1.

As shown in FIG. 2, an air inlet port 15 which is used to introduce the air into the permeable layer 11 is formed in the ventilating structure 10, 11, 12 at a location corresponding to the rear end of the seating pad 6 and the bottom of the back rest 7. A hose (introduction passage) 20, which is used to introduce part of the air at a given temperature from an air conditioner 3 by providing a communication between the permeable layer 11 and an air discharge port 3A of the air conditioner 3, is connected to the air inlet port 15. The hose 20 is molded from synthetic resin into the configuration a bellows so as to be flexible and extensible/shrinkable. As shown in FIG. 1, an adapter 21 attached to the inlet end is connected to the air discharge port 3A of the air conditioner 3 while a connector 22 attached to the outlet end is connected to the air inlet port 15. An air regulating valve 23 is connected in the hose 20 for adjustably throttling the internal air passage and for interrupting the air passage and releasing the air to the exterior. Accordingly, air at a given temperature (cold or warm air) which is delivered from the air discharge port 3A of the air conditioner 3 is fed into the permeable layer 11 while its flow rate is adjusted by the air regulating valve 23. The adapter 21 comprises a foam molded product from foamed styrol or an elastically deformable molded product from urethane or the like which is molded in conformity to the configuration of the air discharge port 3A, or may comprise a joint member.

Along the outer edge of the permeable layer 11, a clearance 11A is formed at the front end of the seating pad 6 while a clearance 11B is formed at the upper end of the back rest 7. These clearances 11A, 11B cannot be contacted or blocked by a user when he sits on the vehicle seat 2, providing a communication between the interior and the exterior of the permeable layer 11. It will be noted that these clearances 11A, 11B are located to be most distant from the air inlet port 15. Accordingly, when air is introduced into the permeable layer 11 from the exterior and the entire surface of the permeable section 14 of the upper layer 12 is blocked, the introduced air can find its way to the outside through the clearances 11A, 11B.

The operation of the vehicle seat 2 will now be described. Referring to FIG. 3, the hose 20 is used to connect the air inlet port 15 and the air discharge port 3A of the air conditioner 3. When a user sits on the vehicle seat 2 and the engine is started to operate the air conditioner 3, an air at a given temperature (cold or warm air) from the discharge port 3A is introduced into the permeable layer 11 through the hose 20. As shown in FIG. 2, the air introduced into the permeable layer 11 passes through a clearance defined within the cushion member 11 held sandwiched between the non-permeable section 13 and the lower layer 10, and branches into the both portions thereof which are disposed toward the seating pad 6 and the back rest 7. In an area of the respective permeable sections 14 which is contacted by the user, an air channel is formed within the cushion member 11 held sandwiched between such contacted area and the lower layer 10, whereby the introduced air flows in contact with the part of the body (thigh, buttocks, and back) in areas of contact with the seating pad 6 and the back rest 7 to be displaced externally through the clearances 11A, 11B. In this manner, it is possible to cool or warm part of the body (thigh, buttocks and back) immediately upon operating the air conditioner 3, thus achieving a comfortable seated condition at the same time as the air at a given temperature is introduced. Thus, the body can be cooled down when cold air is introduced from the air conditioner 3 in the hot season while the body can be warmed when a warm air is introduced in the cold season. Because the introduced air at a given temperature flows in direct contact with the body of the user in permeable sections 14 which are contacted by the user, there can be no sweating or no transfer of the heat from the seat to the user, again achieving a comfortable seated condition. Because the air regulating valve 23 is provided in the hose 20, the flow rate of the introduced air can be adjusted, thus controlling the comfortableness in accordance with the sensation of the user to hotness and coldness. Since the air introduced at a given temperature is brought into direct contact with the body of the user, there is no need to provide a large temperature differential of the air temperature with respect to the bodily temperature. As compared with a conventional practice in which the temperature within the compartment is raised and lowered to secure the comfortableness through an adjustment of the temperature in the compartment, the operating cost can be reduced. In particular, during the running of the automobile, the power dissipation of the air conditioner, and hence the fuel cost can be reduced. The provision of the non-permeable section 13 having a heat insulating capability between the seating pad 6 and the back rest 7 avoids an adverse influence of the air temperature upon the waste of the user.

Figure 5:
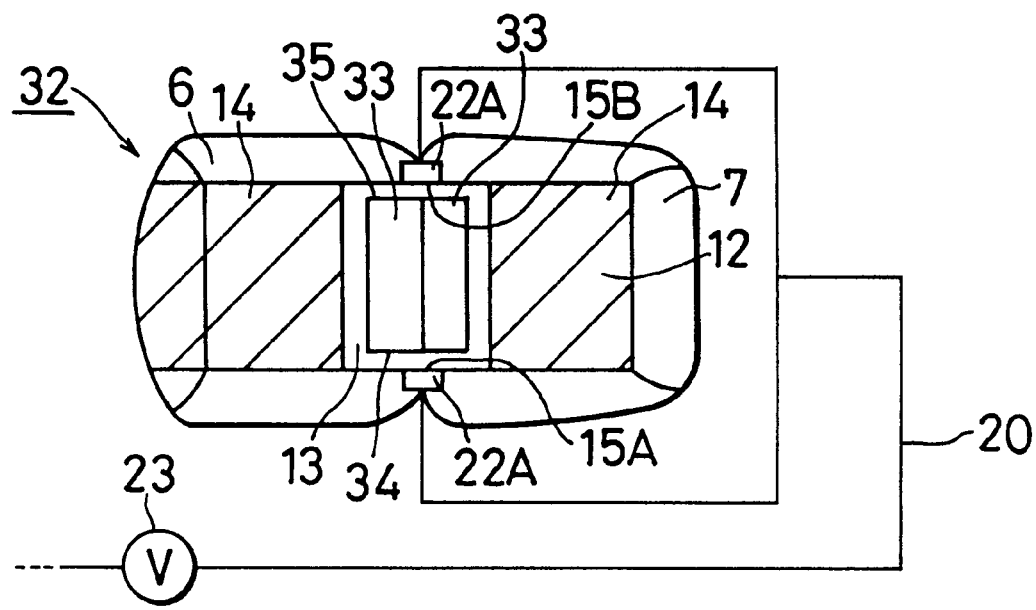
FIG. 5 is an illustration of a vehicle seat according to a second embodiment of the invention.
Figure 6:
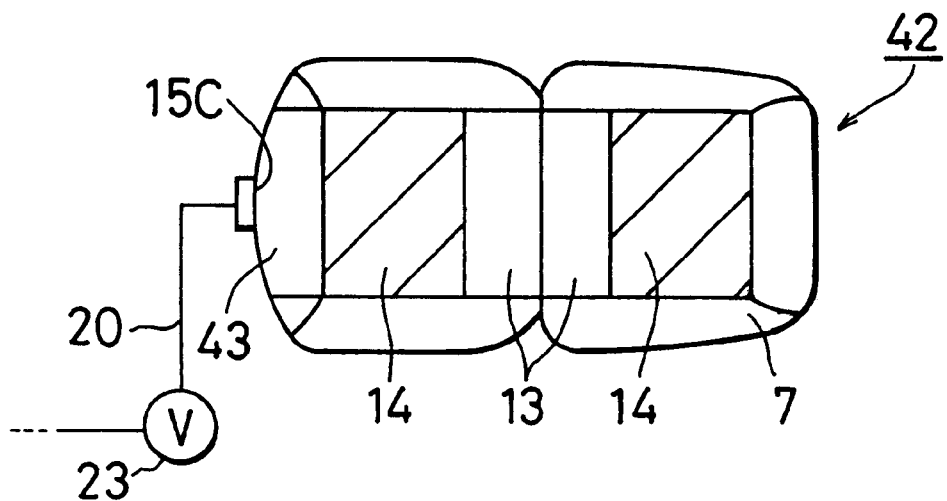
FIG. 6 is an illustration of a vehicle seat according to a third embodiment of the invention.
Figure 7:
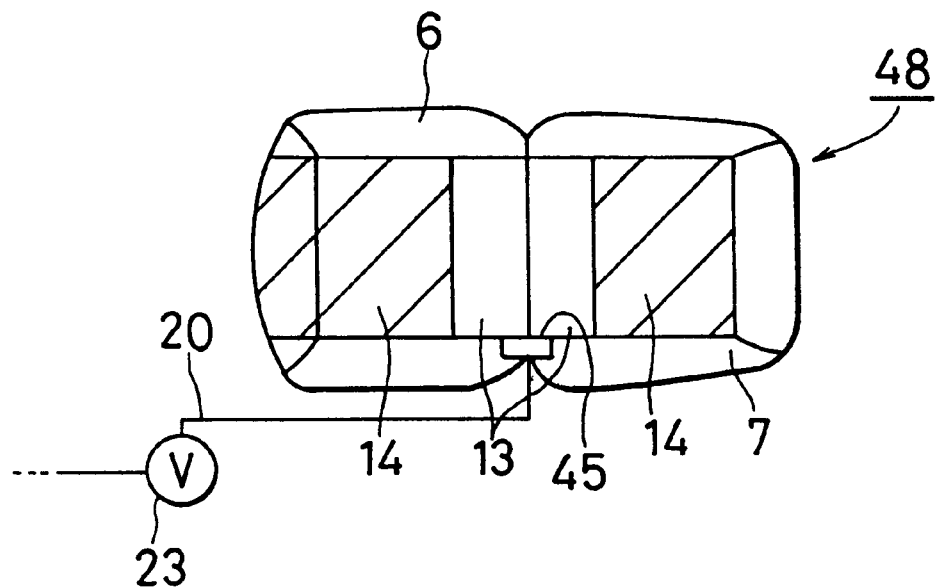
FIG. 7 is an illustration of a vehicle seat according to a fourth embodiment of the invention.

Referring to FIGS. 5 to 7, vehicle seats 32, 42 and 48 according to a second, a third, and a fourth embodiment of the invention will be described. It is to be noted that parts corresponding to those shown in the first embodiment are designated by like reference numerals and characters as used before. In the vehicle seat 32 according to the second embodiment shown in FIG. 5, the permeable cushion member 11 disposed between the upper layer 12 and the lower layer 10 is replaced by a non-permeable cushion member (filler member) 33 substantially at the center of the non-permeable section 13 to define a non-permeable layer, and communication paths 34, 35 are formed on the opposite lateral sides of the non-permeable layer 33 for providing a communication between the permeable layer disposed toward the seating pad 6 and the permeable layer 11 disposed toward the back rest 7. On the back side and at locations opposite to the communication paths 34, 35, air inlet ports 15A, 15B are provided for connection with branched connector 22A of the hose 20. Accordingly, there is no air flow through the non-permeable layer 33 of the vehicle seat 32, allowing an adverse influence of the temperature of the introduced air upon the waste to be more completely eliminated as compared with the vehicle seat 2 according to the first embodiment in which the non-permeable section is defined by a sheet member having a heat insulating capability. In the vehicle seat 42 according to the third embodiment shown in FIG. 6, an air inlet port 15C is disposed forwardly of the seating pad 6 of the seat 42, and a non-permeable section 43 is formed in the upper layer 12 adjacent to the air inlet port 15C, thus forming a passage to the permeable-section 14. In the vehicle seat 48 according to the fourth embodiment of the invention, an air inlet port 45 is disposed on one of the lateral sides of the fold between the seating pad of the back rest 7 of the seat 48 for connection with the hose 20, in contradistinction to the vehicle seat 42 according to the third embodiment in which the air inlet port 15C connected with the hose 20 is disposed forwardly of the seating pad 6.

Figure 8:
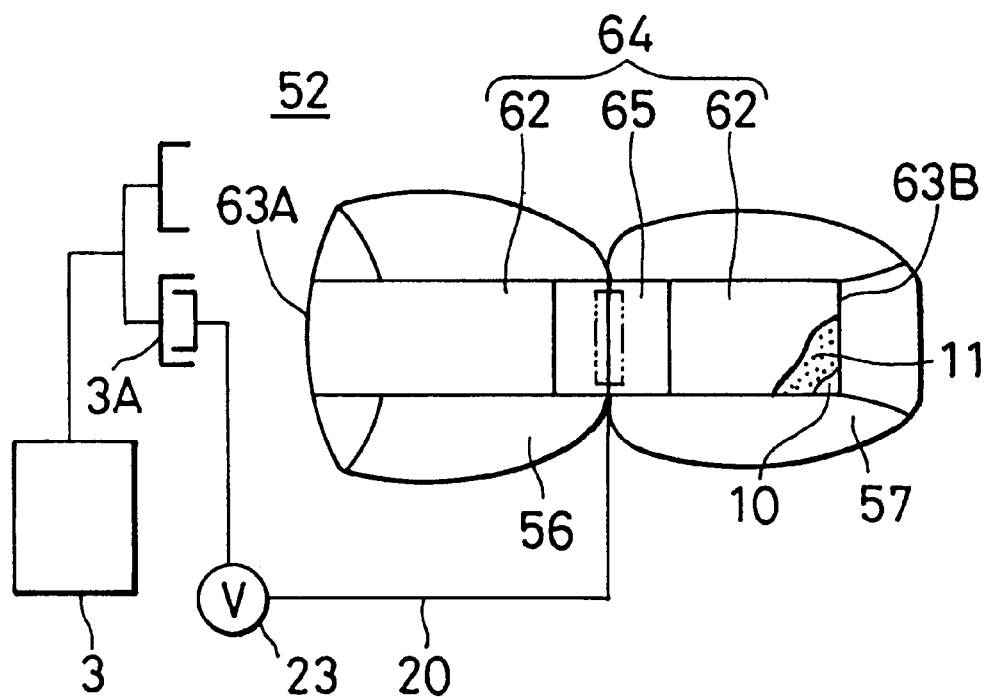
FIG. 8 is an illustration, partly broken away, of a vehicle seat according to a fifth embodiment of the invention.

FIG. 8 shows a vehicle seat 52 according to a fifth embodiment of the invention. A lower layer 10 formed by a non-permeable sheet-like member such as formed from vinyl chloride, leather or the like, a permeable layer 11 mounted on top of the lower layer 10 and formed by a permeable cushion member having pores formed therein through which an air can flow, and an upper layer 64 mounted to cover the upper surface of the permeable layer 11 and formed by a pair of sheet-like non-permeable members 62 and also including clearances 63A, 63B, which provide a communication between the permeable layer 11 and the exterior, formed at given locations around its outer edge, are formed in an integrally continuous manner and disposed toward the front surface of the seat 52. A non-permeable heat insulator 65, formed by a sheet-like member having a heat insulating capability, is disposed between a seating pad 56 and a back rest 57 of the seat 52. It will be seen that the respective layers 10, 11 and 64 constitute together a ventilating structure on the front surface of the seat 52. The back surface of the vehicle seat 52 is connected with a hose 20 communicating with the ventilating structure 10, 11, 64 and introducing air at a given temperature from the air conditioner 3 into the permeable layer 11. As a result of the described construction of the vehicle seat 52, when a user sits on the seat 52 and air at a given temperature is introduced into the permeable layer 11 through the hose 20, the air flows in branched manner toward the seating pad 56 and the back rest 57, defining an air channel within the permeable layer 11 which is held sandwiched between the upper layer 64 and the lower layer 10 while the air which worked is externally displaced through paths 63A, 63B. Since the introduced air at the given temperature flows in contact with the rear surface of the non-permeable members 62 which are in contact with the user, the body of the user can be cooled or warmed in accordance with the temperature of the introduced air. Since a direct contact of the introduced air with the user is avoided, the air which is strongly cooled or warmed can be introduced without causing a discomfort since the air temperature is tempered when being conveyed to the user, thus achieving a comfortable seated condition.

It is to be noted that while the permeable section 14 is formed in a range which is narrower than contacted locations C1, C2 (see FIG. 3) when a user is seated upon the seat, it should be understood that the permeable section may be formed substantially in conformity to the contacted locations C1, C2 or in a range slightly greater than such contacted locations, allowing the air which is introduced from the non-contacted permeable section 14 to be vented externally. In this instance, it is unnecessary to provide the clearances 11A, 11B. While the embodiments have been described as the invention is applied to a vehicle such as an automobile, it should be understood that the invention is not limited thereto, but is equally applicable to other vehicles such as aircrafts or marine vessels. In addition, while in the above description of the embodiments, the vehicle seat is connected with an air conditioner to introduce cold or warm air into the seat, it should be understood that the invention is not limited thereto, but that it is only necessary that the air sheet be connected to an external air discharging mechanism such as a blower or drier, for example, for introducing air at a normal temperature or dry air to improve the comfortableness. While in the described embodiments, the hose is connected to each seat, the hose may be branched to connect with a plurality of seats. The provision of the air regulating valve 13 can be dispensed with if the flow rate from the air conditioner 3 is adjusted. In addition, part of the hose 20 may be assembled into the vehicle seat 2, thus reducing the exposed appearance of the hose 20.

With the vehicle seat according to the first embodiment of the invention, the body of the user can be cooled or warmed immediately upon introducing the air at a given temperature into the seat from the air discharge mechanism, thus providing a comfortable seated condition at the same time as the air is introduced. Since the ventilating structure is provided for each seat, a comfortable seated condition can be assured for each individual user without being influenced by the temperature within the compartment or the location of the seat. Since the air from the air discharge mechanism is allowed to contact part of the body of the user directly, the temperature of the introduced air can be controlled in accordance with a temperature differential relative to the bodily temperature, thus suppressing an operating cost as compared with a conventional practice in which the temperature of the air within the compartment is adjusted by means of the air conditioner. In addition, the vehicle seat can be manufactured inexpensively with a simple construction. Because the ventilating structure is provided inside the seat, the free space within the compartment can be increased to enhance the comfortability as compared with the provision of the air cushion on the seat as is conventional.

With the vehicle seat according to the fifth embodiment of the invention, when the air from the air discharge mechanism is introduced into the ventilating structure of the seat, the body of the user can be cooled or warmed through the non-permeable member interposed. Accordingly if a strongly cold or warmed air is introduced into the seat, the air cannot contact the user directly, assuring a comfortable condition.

Figure 9:
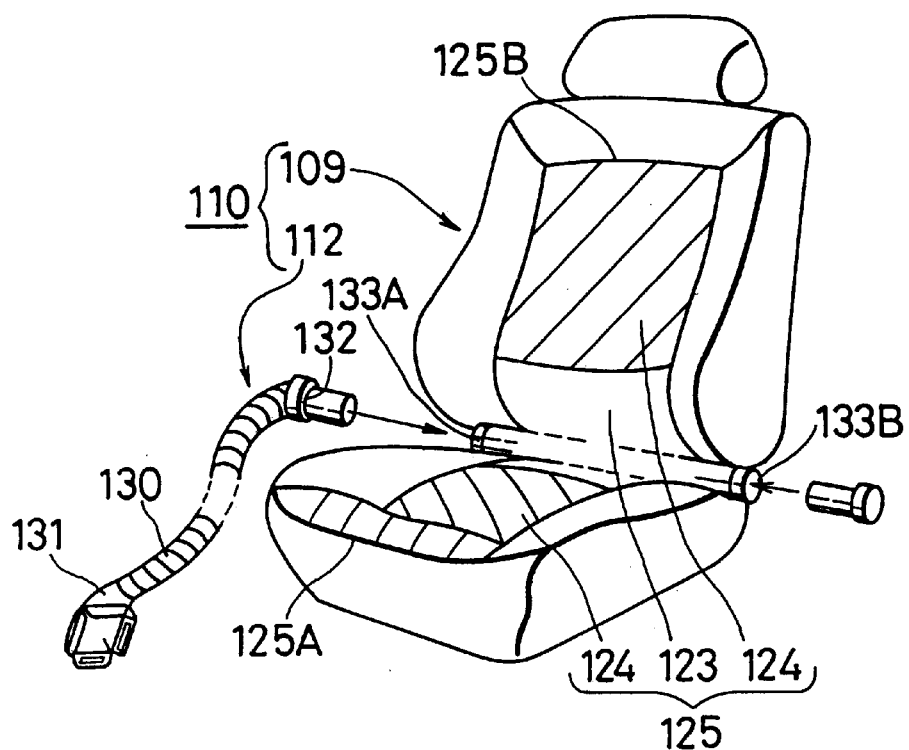
FIG. 9 is a perspective view of a vehicle seat according to a sixth embodiment of the invention.
Figure 10:
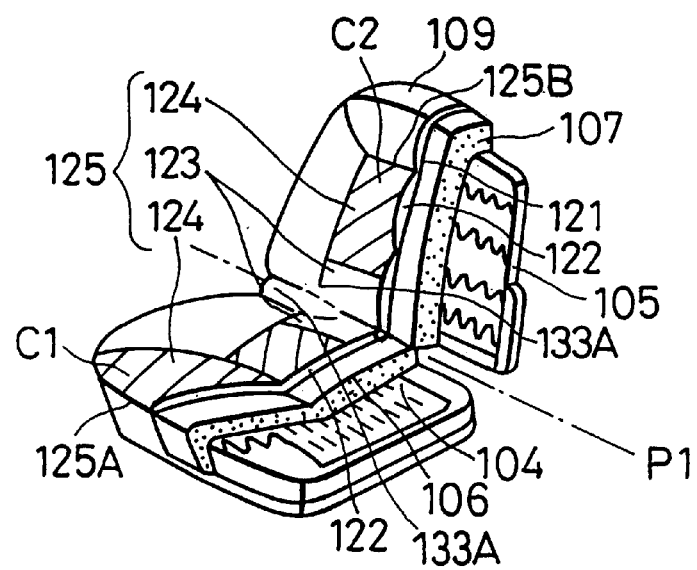
FIG. 10 is a perspective view, partly broken away, of an internal structure of the vehicle seat shown in FIG. 9.

A vehicle seat assembly 110 according to a sixth embodiment of the invention will now be described. The vehicle seat assembly is used on an automobile equipped with an external air discharge mechanism, not shown, such as an air conditioner, a blower, a heater or the like, for example. Referring to FIG. 9, the vehicle seat assembly 110 comprises a seat 109, and an introduction hose assembly 112 which connects the seat 109 with an external air discharging mechanism. Referring to FIG. 10, the seat 109 includes a seating pad 106 mounted on a seat cushion frame 104 and a seat pad 107 mounted on a seat back frame 105 to provide a back rest.

Figure 14:
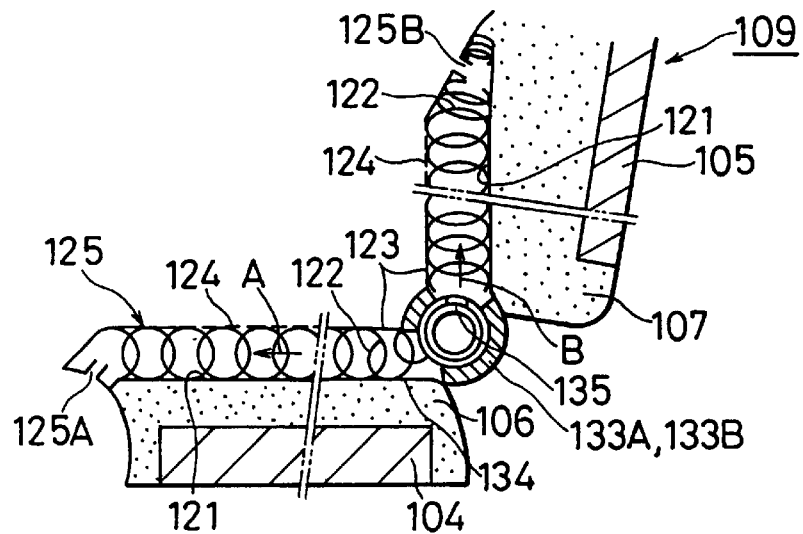
FIG. 14 is a schematic illustration of the structure of the vehicle seat shown in FIG. 9.

Referring to FIGS. 10 and 14, the seat 109 comprises a lower layer 121 formed by a non-permeable sheet-like member such as formed from vinyl chloride, leather or the like, a permeable layer 122 mounted on top of the lower layer 121 and formed by a cushion member having pores formed therein through which an air can flow, and an upper layer 125 mounted on the upper surface of the permeable layer 122 and having a non-permeable section 123 and a permeable section 124 formed at given locations thereon, these layers being formed in an integrally continuous manner. The cushion member 122 is a resilient, foldable and flexible cushion member having a given thickness, and is provided by weaving a plastic mono-filament yarn in the manner of a pile yarn on the double pile loom into a honeycomb structure as shown in FIG. 14. Clearances 125A, 125B are formed in the upper layer at the front end of the seating pad and at the upper end of the back rest, respectively, and these clearances cannot be contacted or blocked by the user when he sits on the seat 109, thus maintaining a communication between the interior and the exterior of the permeable layer 122. The permeable section 124 of the upper layer 125 is formed by a permeable textile fabric or a meshy cloth, and is formed substantially in conformity to the locations C1 (thigh, buttocks) and C2 (back) which are contacted when a user sits on the seat. In the present embodiment, the permeable section 124 is formed in a range slightly narrower than the contacted locations C1, C2. (The permeable section 124 is shown hatched in FIG. 9.) The non-permeable section 123 is formed by a heat insulating sheet-like member, and is formed to a given length along the fold between the seating pad and the back rest of the seat 109 so as to correspond to the waste of the user when he sits on the seat.

Figure 11:
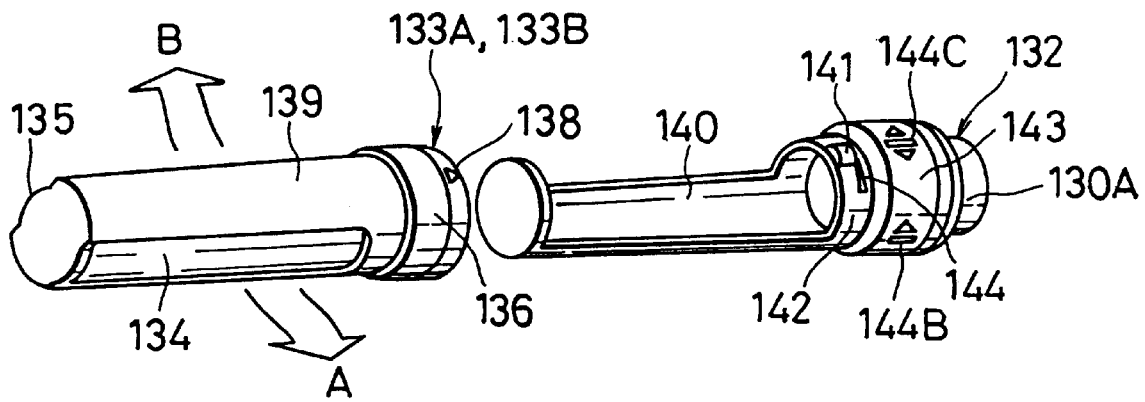
FIG. 11 is an illustration of a connector and a connector receiver used in the vehicle seat shown FIG. 9.

Referring to FIG. 9, the introduction hose assembly 112 comprises a flexible and extensible/shrinkable hose 130 which is molded from a synthetic resin into the configuration of the bellows, an adapter 131 attached to an inlet end of the hose 130 and connected to an air discharge mechanism so as to cover an air discharge port thereof, and a connector 132 attached to an outlet end of the hose 130. The seat 109 is provided with air inlet ports disposed on the opposite lateral sides of the fold P1 between the seating pad and the back rest, and connector receivers 133A, 133B are mounted on these air inlet ports. As shown in FIG. 11, the connector 132 of the introduction hose assembly 112 is fitted into one of the connector receivers 133A, 133B for purpose of connection.

Figure 13:
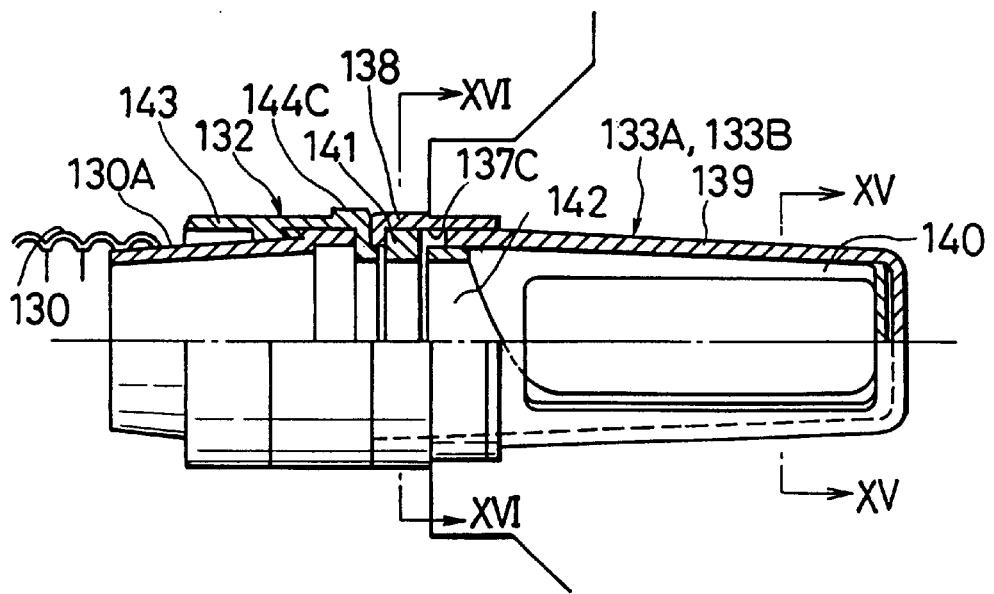
FIG. 13 is a longitudinal section of the connector and the connector receiver of the vehicle seat shown in FIG. 9 when they are connected together.
Figure 15:
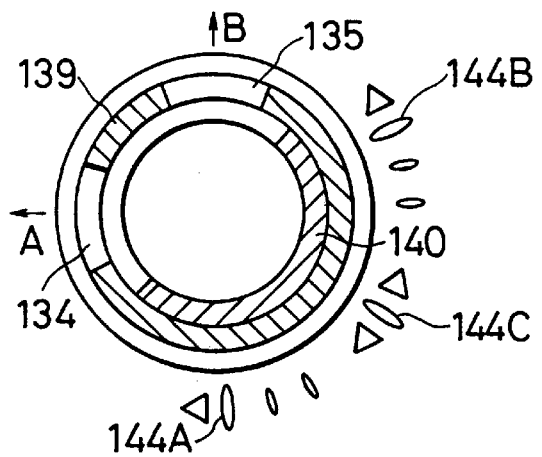
FIG. 15 is a longitudinal section taken along the line XV—XV shown in FIG. 13.
Figure 16:
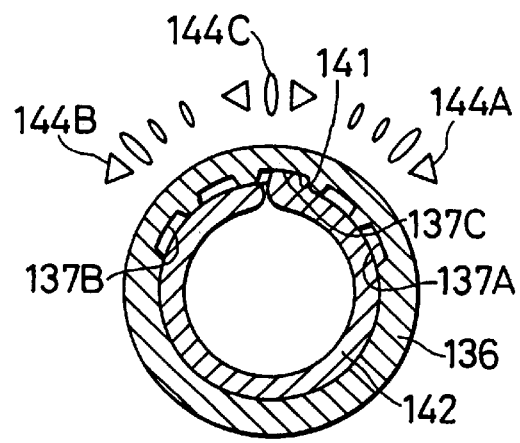
FIG. 16 is a longitudinal section taken along the line XVI—XVI shown in FIG. 13.

Referring to FIGS. 11, 13 and 14, each of the connector receivers 133A, 133B includes a sleeve of a reduced diameter 139 having a pair of elongate slots 134, 135 formed at given circumferential positions which depend on an angle of inclination between the seating pad and the back rest, which slots open into the cushion member 122 disposed toward the seating pad (indicated by an arrow A shown in FIGS. 11, 14 and 15) and into the cushion member 122 disposed toward the back rest of the seat 109 (see arrow B shown in FIGS. 11,14 and 15). Referring to FIG. 16, each of the connector receivers 133A, 133B includes a sleeve of an increased diameter 136 which continues from the outer periphery of the sleeve 139 and having engaging grooves 137 (137A, 137B, 137C) formed at given circumferential positions around its inner periphery. Toward its opening, each of the connector receivers 133A, 133B is formed with a reference indicator 138 which represents a rotational position of the connector 132 relative to either connector receiver 133A, 133B.

Referring to FIGS. 11, 13, 15 and 16, the connector 132 comprises a split sleeve 140 which is slidable and rotatable when fitted into the sleeve 139, a sleeve-like portion 142 which is formed in a manner corresponding to the sleeve 136 of an increasing diameter of either connector receiver 133A, 133B and having a detent pawl 141 which is resiliently engaged in one of the engaging grooves 137, and a larger diameter portion 143 formed on the side of the sleeve-like portion 142 disposed toward the hose 130 and which is brought into abutment against the indicator 138 on either connector receiver 133A, 133B. The larger diameter portion 143 is rotatably connected to a connection sleeve 130A which is attached to the hose 130. When the connector 132 is inserted into either connector receiver 133A, 133B and turned, the split sleeve 140 blocks either one of the elongate slots 134, 135 or open both of them depending on the rotational position, thus selectively guiding the air at a given temperature which is introduced through the introduction hose assembly 112 from an external air discharge mechanism, not shown, such as an air conditioner, a blower, a heater or the like, into at least one of the cushion members 122 of the seat 109 which are disposed toward the seating pad and the back rest.

Referring to FIG. 11, the sleeve-like portion 142 is formed with an L-shaped cut-in groove around the detent pawl 141, thus causing the detent pawl 141 to be elastically displaced in a radial direction. When the connector 132 is inserted into one of the connector receivers 133A, 133B and is then turned, the detent pawl 141 fits in one of the engaging grooves 137 formed around the inner periphery of the sleeve 136 of an increase diameter of the corresponding connector receiver 133A, 133B, preventing a further rotation of the connector 132 and also serving to prevent the latter from being withdrawn. Referring to FIGS. 11, 15 and 16, the larger diameter portion 143 of the connector 132 is provided with indicators 144A, 144B, 144C representing given circumferential positions of the connector 132. (Indicator 144A represents the introduction of the air toward the seating pad of the seat 109; indicator 144B represents the introduction of the air toward the back rest; and indicator 144C represents the introduction of the air toward both the seating pad and the back rest.) When the connector 132 is inserted into one of the connector receivers 133A, 133B and is then turned and a desired one of the indicators 144A, 144B, 144C is brought into alignment with the indicator 138, the split sleeve 140 opens or blocks a given one or ones of the elongate slots 134, 135 depending on the rotational position. The detent pawl 141 fits in one of the engaging grooves 137A, 137B, 137C which corresponds to one of the indicators 144A, 144B, 144C, thus blocking further rotation of the connector 132 and preventing the connector 132 from being withdrawn from either connector receiver 133A, 133B.

Figure 12:
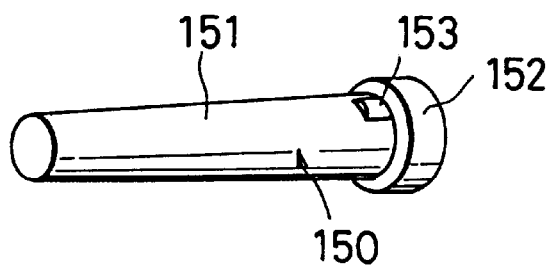
FIG. 12 is a perspective view of a plug member used in the vehicle seat of FIG. 9.

Referring to FIG. 12, a cylindrical plug member 150 is inserted into either connector receiver 133A, 133B to interrupt a communication between the inside and the outside of the seat 109. The plug member 150 comprises a sleeve of a reduced diameter 151 which is inserted into one of the connector receivers 133A, 133B to block elongate slots 134, 135 and also carrying a projection 153 which can fit in one of the engaging grooves 137, and a sleeve of an increased diameter 152 formed on the outside of the sleeve 151 and which is adapted to be brought into abutment against the indicator 138. When the connector 132 of the introduction hose assembly 112 is connected with one of the connector receivers 133A, 133B in the seat 109, the plug member 150 is mounted in the other of the connector receivers 133A, 133B for a balanced guidance of the introduced air in a desired flow direction while preventing a leakage of the introduced air in the permeable layer 122 from the other connector receiver.

Figure 17:
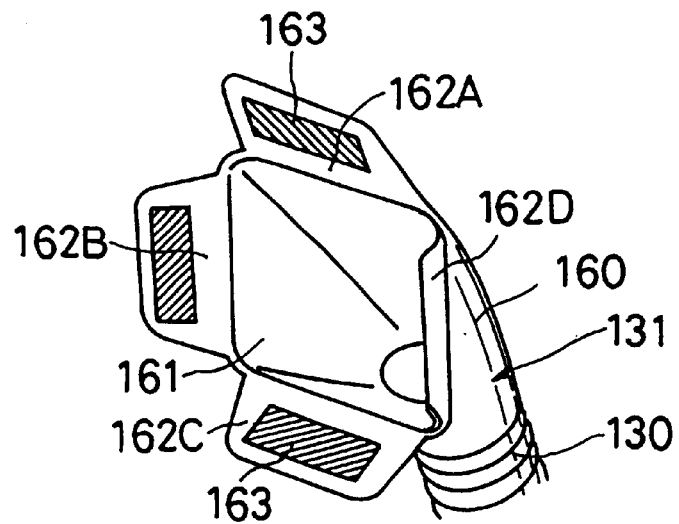
FIG. 17 is a perspective view of an adapter used in the vehicle seat shown in FIG. 9.

Referring to FIG. 17, the adapter 131 comprises a base 160 connected with the hose 130 and having an enlarging air inlet port 161, and a plurality of applied pieces 162A, 162B, 162C, 162D mounted in a rockable manner along the air inlet port 161 to cover an air discharge port of an external air discharge mechanism, not shown. It will be seen that an adhesive material 163 is applied to the inside of each of the applied pieces 162A–162D so as to surround the air discharge port in accordance with the configuration and size of the air discharge port. It is to be noted that the applied pieces 162A–162D are designed to allow the air to be efficiently received by the introduction hose assembly 112 if they do not completely cover the air discharge port of an air conditioner which is mounted on the vehicle as the adapter 131 is connected to the air conditioner, or in the presence of any slight clearances therebetween.

Figure 18:
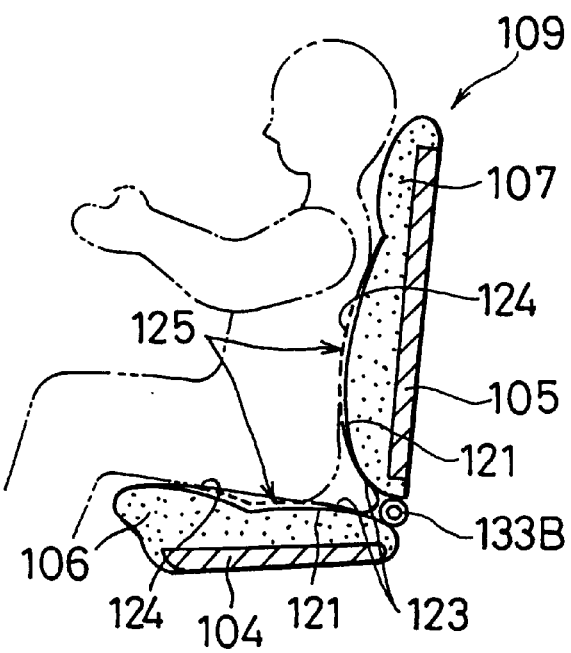
FIG. 18 is an illustration of the user sitting on the vehicle seat shown in FIG. 9.

The operation of the vehicle seat according to the sixth embodiment will now be described. Referring to FIG. 18, when a user sits on the seat 109 disposed within the compartment of an automobile equipped with an external air discharge mechanism, not shown, the connector 132 of the introduction hose assembly 112 is connected to one of the connector receivers 133A, 133B in the seat 109 while the plug member 150 is mounted in the other connector receiver. The applied pieces 162A, 162B, 162C, 162D of the adapter 131 are applied in surrounding relationship with one of air discharge ports of an external air discharge mechanism, for example, an air conditioner, not shown, thus covering the selected one of the air discharge ports.

The user then turns the larger diameter portion 143 of the connector 132 to bring a desired one of the indicators 144A, 144B, 144C into alignment with the indicator 138 on the corresponding connector receiver 133A or 133B. For example, when the indicator 144A is brought into alignment with the indicator 138, the split sleeve 140 opens the elongate slot 134 and blocks the elongate 135, and at this position of the sleeve, the detent pawl 141 fits in the engaging groove 137A, thus locking the connector 132 with respect to the corresponding connector receiver 133A or 133B. The engine is then started to operate the external air discharge mechanism, not shown, whereupon air at given temperature (a cold or warm air) from the air discharge port of the air conditioner is introduced into one of the permeable layers 122 which is disposed toward the seating pad of the seat 109 through the introduction hose assembly 112. When the indicator 144B is brought into alignment with the indicator 138, the split sleeve 140 opens the elongate slot 135 and blocks the elongate slot 134, and the detent pawl 141 fits in the engaging groove 137B. Accordingly the air is introduced into the permeable layer which is disposed toward the back rest. When the indicator 144C is brought into alignment with the indicator 138, the split sleeve 140 opens the both elongate slots 134, 135, whereby air is introduced into the permeable layer 122 disposed toward both the seating pad and the back rest.

The air which is introduced into the permeable layer 122 of the seat 109 through the introduction hose assembly 112 passes through the interior of at least one of the cushion members 122 which are disposed toward the seating pad or the back rest of the seat 109, and the air which flows into the permeable section 124 contacts part of the body (either back or the thigh, and buttocks) while the air which worked is displaced through discharge sections 125A, 125B. In this manner, the connector 132 can be brought to a desired rotational position, thus controlling the direction of flow of the air which passes through the permeable layer 122 of the seat 109. It is also possible to turn the connector 132 in a manner to prevent the engagement of the detent pawl 141 with one of the engaging grooves 137 so that the indicator 138 is positioned intermediate the indicators 144A, 144B, 144C, thus adjusting the area of opening presented by the elongate slots 134, 135 to control the flow rate of the air which is introduced into the permeable layer 122 of the seat 109. Since the applied pieces 162A–162D of the adapter 131 are applied around the air discharge port to cover it, the adapter 131 of the introduction hose assembly 112 can accommodate for a variety of air discharge ports without being influenced by the configuration or size of such air discharge port. In this manner, with the vehicle seat according to the present embodiment, the direction of flow of the air which is introduced into the permeable layer of the seat can be freely changed with a simple construction, a fine adjustment of the flow rate of the air is permitted, and an accommodation for a variety of configurations of the air discharge port is achieved.

Figure 19:
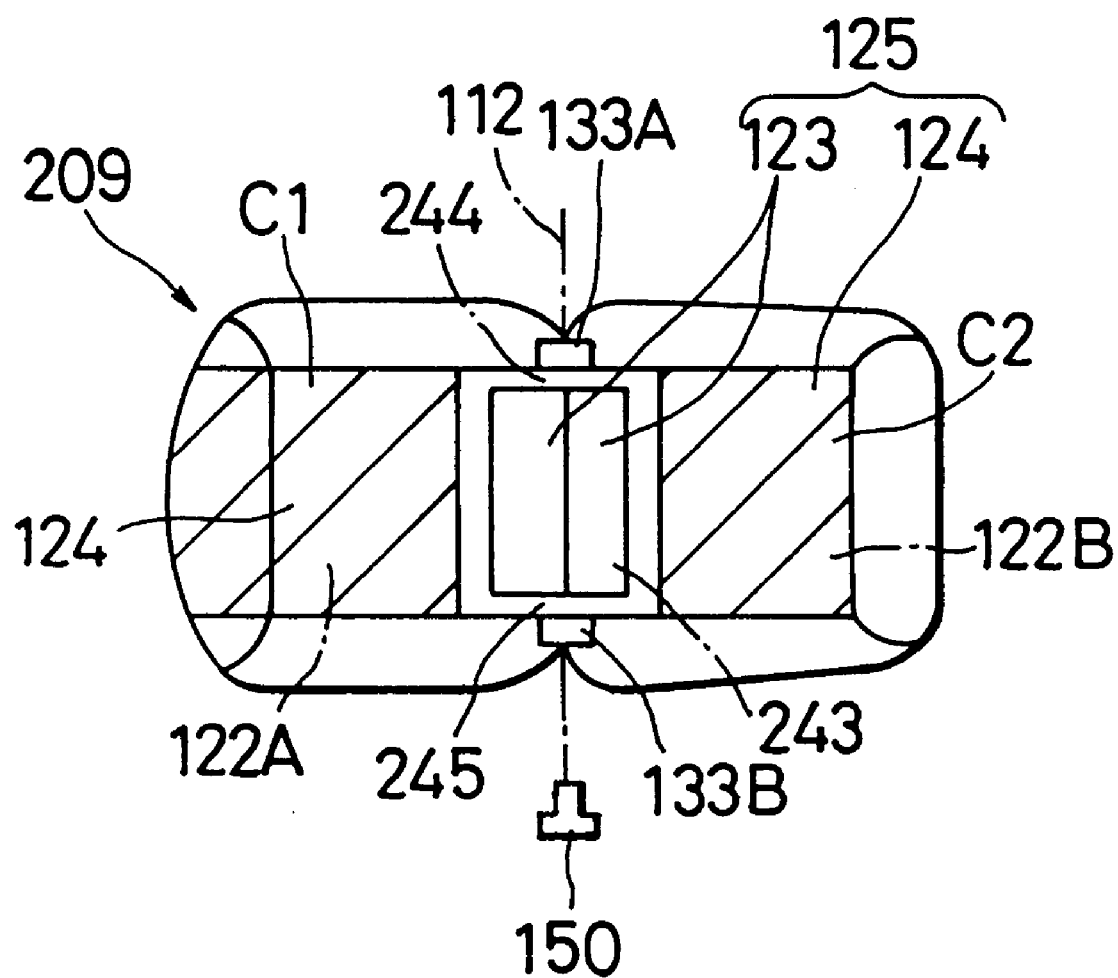
FIG. 19 is an illustration of a vehicle seat according to a seventh embodiment of the invention.

FIG. 19 shows a vehicle seat 209 according to a seventh embodiment of the invention. In the seat 209, the permeable cushion member 122 which is interposed between the upper layer 125 and the lower layer 121 is replaced by a non-permeable cushion member 243 to define a non-permeable layer substantially at the center of the non-permeable section 123 in the upper layer 125. Permeable cushion members 122 are disposed between the upper and the lower layer 121, 125 on the opposite sides of the non-permeable layer 243, thus forming communication paths 244, 245 which provide a communication between the permeable layer 122A disposed toward the seating pad and the permeable layer 122B disposed toward the back rest. Accordingly, an adverse influence of the temperature of the introduced air upon the waste can be completely eliminated when the air is introduced into the seat 209.

In the sixth and the seventh embodiment, three engaging grooves are formed at a given circumferential spacing in the connector receiver, but it should be understood that the invention is not limited thereto, but that a number of engaging grooves may be provided circumferentially to define the circumferential position of the split sleeve 140 more finely to enable it to be locked for each choice of the area of opening provided by the elongate slots 134, 135. While the permeable section 124 is provided on the surface of the permeable cushion member 122, the invention is not limited thereto. Instead, the entire front surface of the cushion member 122 may be formed by a non-permeable thin sheet to prevent a direct contact of the air with the body of the user while allowing the air temperature to be transmitted to the body through the sheet. In this instance, a highly heat insulating non-permeable member may be provided in a region surrounding the waste. Where the external air discharge mechanism such as an air conditioner is not used, it will be obvious that the introduction hose assembly 112 need not be provided. In addition, the introduction passage may be provided below the floor of the vehicle and connected to the seat through an opening formed in the floor. In this instance, the hose does not appear above the floor, thus preventing any interference with the user. In the described embodiments, the connector is fitted to the connector receiver and is then turned, but the invention is not limited thereto, but the air control can also be achieved by an axial displacement between the connector and the connector receiver.

It will be seen that with the vehicle seat according to the sixth embodiment of the invention, the direction of flow of the air which is introduced into the permeable layer can be freely changed with a simple construction, and the flow rate of the air which is introduced into the permeable layer can be adjusted, thus improving the comfortability. Since the air channel is previously assembled into the seat, a mere connection of the introduction passage allows an external air supply to be utilized, thus improving the convenience. In addition, an accommodation for a variety of differing types of external air discharge ports is provided, thus enhancing the universal applicability of the introduction hose, permitting a reduction in the manufacturing cost.

what is claimed is:

1. A vehicle seat for a vehicle equipped with an air discharge mechanism, comprising a lower layer formed by a non-permeable member, a permeable layer mounted on top of the lower layer and formed by an air channel member having a clearance formed therein through which air can flow, and an upper layer mounted to cover the upper surface of the permeable layer and having a permeable section formed therein which provides a communication between the permeable layer and the upper layer being disposed toward the front surface of the seat, and an introduction passage for connecting the permeable layer with an air discharge port of the air discharge mechanism and for introducing part of an air which is delivered from the air discharge mechanism into the permeable layer, wherein the introduction passage comprises a flexible hose which is also extensible/shrinkable, an adapter attached to an inmlet end of the hose and connected to an external air discharge port, and a connector mounted on an outlet end of the hose and connected to an air inlet port formed in the seat, and wherein a connector receiver is disposed in the air inlet port to receive the connector to thereby permit a relative displacement between the connector and the connector receiver as they are connected together, thereby controlling the flow rate of the air which is introduced into the permeable layer.

2. A vehicle seat according to claim 1 in which a pair of connector receivers are provided, one on each lateral side of a fold between a seating pad and a back rest of the seat, the connector of the introduction passage being connected to one of the connector receivers while a plug member which interrupts a communication between the inside and the outside of the permeable layer is detachably mounted in the other connector receiver.

3. A vehicle seat according to claim 1 in which the adapter comprises a base having its one end connected to the hose and having an outwardly enlarging air inlet port formed at the other end, and a plurality of applied pieces formed along the air inlet port and applied around an external air discharge port to cover it.

4. A vehicle seat according to claim 1 in which the connector and the connector receiver are rotatable relative to each other so that when they are connected together, the flow rate of the air which is introduced into the permeable layer is controlled in accordance with the rotational position of the connector.

5. A vehicle seat according to claim 4 in which when the connector is connected with the connector receiver, the connector is locked at a given rotational position.

6. A vehicle seat according to claim 4 in which the flow rate of the air into the permeable layer from the exterior is controllable in accordance with a rotational position of the connector as it is connected with the connector receiver.

7. A vehicle seat according to claim 4 in which the direction of flow of the air which is introduced into the permeable layer can be changed in accordance with a rotational position of the connector as it is connected with the connector receiver.

8. A vechile seat according to claim 4 in which the connector receiver comprises a tubular member including a sleeve of a reduced diameter having slots formed therein which open into the air channel member disposed toward a seating pad and into the air channel member disposed toward a back rest of the seat, and a sleeve of an increased diameter which continues from the outer periphery of the sleeve of a reduced diameter and having a plurality of engaging portions formed at given circumferential positions thereon, and in which the connector comprises a split sleeve which is fitted into the sleeve of a reduced diameter and is then turned, a sleeve-like portion which can be received within the sleeve of an increased diameter and having a detent which is resiliently engaged by one of the engaging portions, and a larger diameter portion formed on the side of the sleeve-like portion disposed toward the hose and which is adapted to be brought into abutment against the sleeve of an increased diameter of the connector receiver, the arrangement being such that when the connector is connected with the connector receiver, the connector is locked at a given circumferential position relative to the connector receiver, also preventing the connector from being withdrawn from the connector receiver.

9. A vehicle seat according to claim 6 in which the direction of flow of the air which is introduced into the permeable layer can be changed in accordance with a rotational position of the connector as it is connected with the connector receiver.

* * * * *

UNITED STATES PATENT AND TRADEMARK OFFICE
CERTIFICATE OF CORRECTION

PATENT NO. : 5,918,930
DATED : July 6, 1999
INVENTOR(S) : Yoshiaki KAWAI et al

Page 1 of 2

It is certified that error appears in the above-identified patent and that said Letters Patent is hereby corrected as shown below:

Column 12, line 13; after "permeable layer and" insert ---an exterior, the lower layer, the permeable layer---.

line 61; change "vechile" to ---vehicle---.

Column 14, lines 5-9; change "A vehicle seat according to claim 6 in which the direction of flow of the air which is introduced into the permeable layer can be changed in accordance with a rotational position of the connector as it is connected with the connector receiver" to ---A vehicle seat according to Claim 8 in which the larger diameter portion of the connector has an indicator which indicates a given circumferential position of the connector while the connector receiver forms, toward its opening, a reference

UNITED STATES PATENT AND TRADEMARK OFFICE
CERTIFICATE OF CORRECTION

PATENT NO. : 5 918 930
DATED : July 6, 1999
INVENTOR(S) : Yoshiaki KAWAI et al

It is certified that error appears in the above-identified patent and that said Letters Patent is hereby corrected as shown below:

indicator which indicates a rotational position of the connector with respect to the connector receiver---.

Signed and Sealed this
First Day of February, 2000

Attest:

Q. TODD DICKINSON

Attesting Officer

Acting Commissioner of Patents and Trademarks